United States Patent [19]
Wilson

[11] 3,951,344
[45] Apr. 20, 1976

[54] RADIAL JET AERATOR MODULE

[75] Inventor: George E. Wilson, Carmichael, Calif.

[73] Assignee: Houdaille Industries, Inc., Buffalo, N.Y.

[22] Filed: Dec. 14, 1973

[21] Appl. No.: 424,795

[52] U.S. Cl. ............................ 239/421; 239/434.5; 239/549
[51] Int. Cl.² .......................................... B05B 7/00
[58] Field of Search ............. 239/421, 428.5, 434.5, 239/548, 549, 555; 261/116, DIG. 5, DIG. 39, DIG. 70, DIG. 75

[56] References Cited
UNITED STATES PATENTS

| 2,049,940 | 8/1936 | Barthel ........................... 239/549 X |
| 3,724,762 | 4/1973 | Freshour ....................... 239/428.5 X |
| 3,777,985 | 12/1973 | Hughes et al. ..................... 239/555 |

FOREIGN PATENTS OR APPLICATIONS

| 170,857 | 10/1921 | United Kingdom ................. 239/421 |
| 12,832 | 4/1913 | United Kingdom ................. 239/548 |

Primary Examiner—John J. Love
Attorney, Agent, or Firm—Fitch, Even, Tabin & Luedeka

[57] ABSTRACT

A jet aerator module for securing intimate contact and admixture between a liquid stream and an oxidizing gas including a housing constructed of sheet form material, a gas inlet in the housing for introducing a pressurized oxidizing gas into the housing, a liquid inlet in the housing axially spaced from the gas inlet for introducing liquid to be treated into the housing, an inner liquid carrying chamber composed of sheet form material disposed within the housing in spaced relation to the gas inlet, thereby providing a gas chamber between the chamber and the gas inlet, the housing being provided with angularly spaced relatively large diameter jet nozzles about its periphery, and the inner chamber being provided with smaller diameter jet nozzles about its periphery in axial registry with the relatively large diameter jet nozzles in the housing. The construction is such that the entire module is relatively lightweight and capable of being manufactured at low cost from readily available materials.

7 Claims, 5 Drawing Figures

U.S. Patent  April 20, 1976  3,951,344
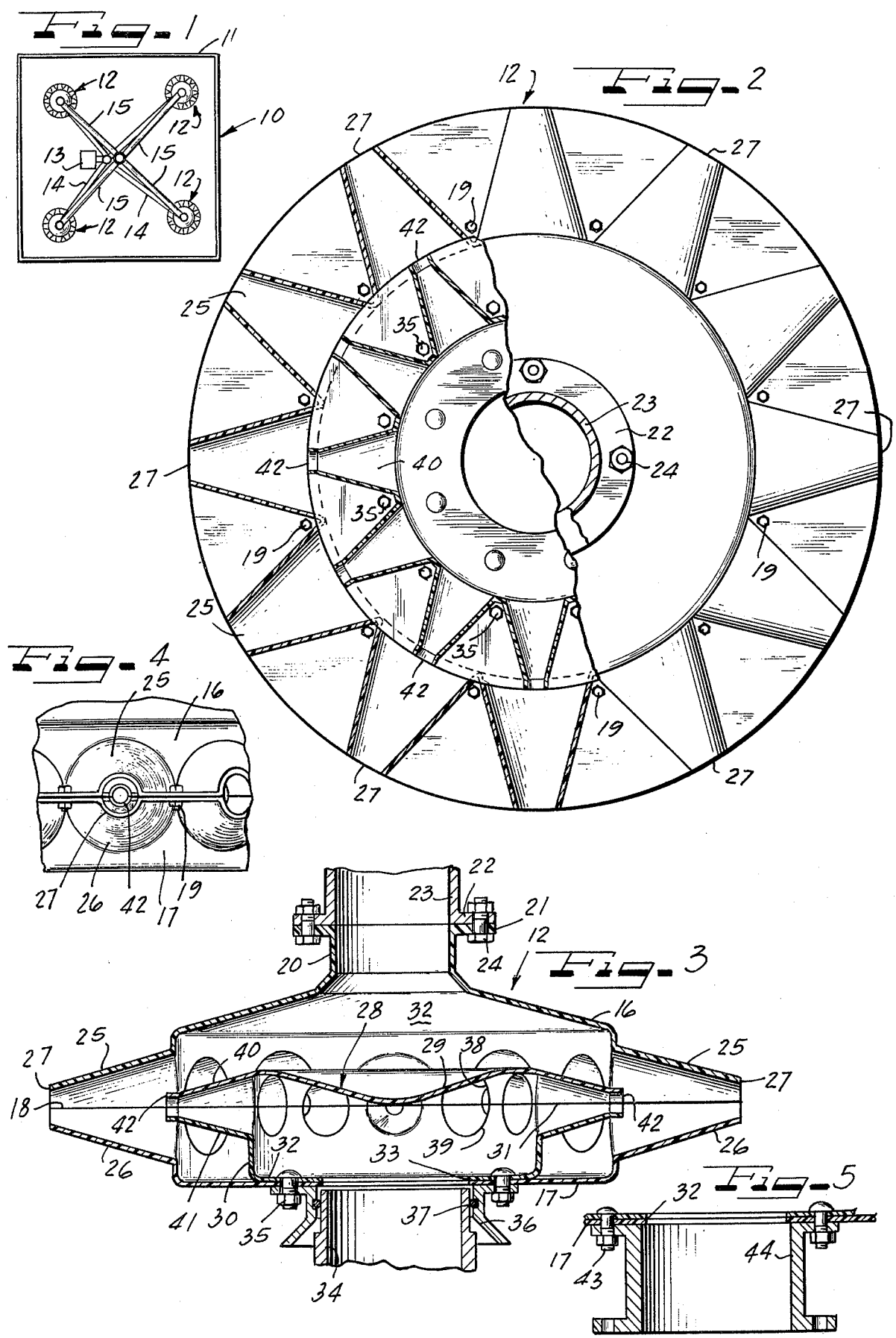

RADIAL JET AERATOR MODULE

BACKGROUND OF THE INVENTION

1. Field of the Invention

This invention is in the field of jet aerators employing coaxial nozzle assemblies wherein liquid to be treated is injected through the inner set of nozzles and aspirates substantial quantities of air or other oxidizing gas before being ejected from the module through the outer set of jet nozzles, causing a turbulent interaction between the gas and the liquid streams.

2. Description of the Prior Art

There are a large number of well known liquid treatment processes which are designed to introduce oxygen into a liquid such as a waste liquid for purification purposes, particularly for the reduction of the biochemical oxygen demand (B.O.D.) of the liquid. One of the most widely used of such systems for treating sewage is the activated sludge system in which incoming sewage is subjected to an initial settling in a presettling tank. Raw sludge is withdrawn from the presettling tank and passes to a sludge digestion system. The effluent from the presettling tank goes to an aeration tank where it is treated with the activated sludge and usually passed to a final settling tank where a relatively pure effluent is withdrawn. The residue from the settling tank is then sent to the sludge digestion stage or to the initial aeration tank. The efficient contact of the sewage with oxygen in the aeration tank is vital to the efficient operation of this process.

There are a wide variety of well known methods and systems for introducing oxygen into the liquid to be treated. One of the simplest and least expensive in terms of operating costs involves merely retaining the waste liquid in a pond or tank or the like which is open to the atmosphere. Some of the oxygen from the air will be transferred into the waste liquid and ultimately will reduce its. B.O.D. but this process is extremely slow and is not generally feasible because of its inherently small capacity.

Another method for reducing the B.O.D. of the waste liquid involves the retention of the liquid in a pond or the like and the introduction of air or oxygen under pressure through a tube or diffuser or the like directly into the waste liquid below the surface thereof. While this system increases the rate at which the B.O.D. is reduced, it does involve operating costs in the form of horsepower consumption for the air fans or compressors or the like.

Another method which has been used in the past involves large rotary brushes which are partially submerged in the liquid and which are slowly rotated so that the brushes themselves ultimately rise out of the liquid and into the atmosphere and entrain air, and then descend into the liquid, whereupon a portion of the entrained air is transferred to the waste liquid. This system also involves substantial consumption of power and in addition requires one or more large rotating mechanical brushes which are subject to deterioration and wear of moving parts after prolonged periods of use.

One of the most efficient methods of introducing air into a waste liquid involves the use of jet aerators which employ the venturi principle. In this method, liquid is pumped through a high velocity liquid jet nozzle, thereby generating a reduced pressure on the discharge side of the nozzle. A mixing chamber or zone surrounds the discharge of the liquid nozzle and is in communication with the atmosphere, either directly or indirectly through an air compressor. The high velocity liquid jet which is discharged from the liquid nozzle mixes with or entrains the air, the air in the mixing zone and the air-liquid mixture is then discharged through a liquid-air nozzle directly into the waste liquid below the surface thereof. In terms of oxygen-liquid transfer, this system involving jet aerators produces greater efficiency than the previously mentioned systems. The introduction of air or oxygen into a waste liquid by means of jet aerators is particularly attractive in terms of system capacity, efficiency and operating costs.

One highly efficient jet aerator type of installation is that known as an "eddy mixer" wherein a plurality of jet aerator nozzles is disposed in a tank and the liquid to be treated is passed through a liquid nozzle whereupon it entrains substantial quantities of air and is then discharged through a liquid-gas nozzle, creating turbulent eddy currents which very efficiently mix the air of other oxidizing gas into the liquid. Heretofore, such aerator assemblies have been relatively cumbersome and expensive since they have been made of relatively massive castings or forgings composed of bronze, stainless steel, or other expensive materials.

SUMMARY OF THE INVENTION

The present invention relates to a jet aerator module of simplified design which lends itself to fabrication from lightweight, inexpensive materials, such as fiber reinforced plastic matrices. The jet aerator modules of the present invention include a housing constructed of sheet form material, the housing having a gas inlet therein for introducing a pressurized oxidizing gas into the interior of the housing. A liquid inlet for the liquid to be treated is formed in the housing in axially spaced relation from the inlet. Disposed within the housing thus formed is a liquid carrying chamber composed of the sheet form material, the upper periphery of the chamber being spaced from the gas inlet to thereby provide a gas chamber between the chamber and the gas inlet. The housing is provided with angularly spaced relatively large diameter jet nozzles about its periphery. Similarly, the inner chamber is provided with smaller diameter jet nozzles about its periphery which nozzles are in axial registry with the relatively large diameter jet nozzles in the housing.

In a specifically preferred form of the invention, the jet aerator module includes an upper housing section composed of sheet form material, a lower housing section also composed of sheet form material, with the upper and lower housing sections mating to define a plurality of peripheral angularly spaced nozzles, the upper housing section having a gas inlet formed therein, and the lower housing section having a liquid inlet therein. A two-piece chamber of sheet form material is secured to the lower housing section in the vicinity of the liquid inlet. This chamber has peripheral angularly spaced nozzles in axial registry with the nozzles formed by the upper and lower housing sections. Means can be provided for releasably engaging the module with a liquid inlet pipe, or the module can be fixedly secured to such pipe.

The module of the present invention provides a significant decrease in cost of aeration systems without a sacrifice in the efficiency of such systems.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic plan view of an aeration tank employing the improvements of the present invention;

FIG. 2 is a plan view of a jet aerator module of the present invention with portions broken away to illustrate more completely the interior structure thereof;

FIG. 3 is a cross-sectional view illustrating the interior construction of the housing;

FIG. 4 is a front elevational view of the aerator module; and

FIG. 5 is a fragmentary cross-sectional view of a modified form of inlet assembly which may be used in conjunction with the module of the present invention.

DESCRIPTION OF THE PREFERRED EMBODIMENTS

In FIG. 1, reference numeral 10 indicates generally an aeration tank assembly for the treatment of liquid waste material including a generally rectangular tank 11 and a plurality of aerator modules 12 located therein. A pump 13 feeds a plurality of liquid supply lines 14 which introduce the liquid to be treated into each of the modules 12. Air or other oxidizing gas under pressure is delivered to the modules 12 by means of air pressure lines 15.

The construction of the individual modules 12 is best illustrated in FIGS. 2 and 3 of the drawings. As seen in these figures, each module 12 consists of an upper housing section 16 and a lower housing section 17 which mate along a line 18, the upper and lower housing sections being joined together by means of bolts 19 or the like supplemented, if necessary by a suitable adhesive. The upper housing section 16 has a cylindrical neck portion 20 which is formed with an annular flange 21 arranged to abut an annular flange 22 on an air inlet pipe 23 and being secured thereto by means of suitable fasteners 24.

The upper housing section 16 has spaced frusto conical sections 25 which cooperate with similarly shaped sections 26 of a lower housing section 17 to define a plurality of peripheral, angularly spaced jet nozzles 27.

Located within the housing provided by the two housing sections 16 and 17 is a two-piece chamber generally indicated at reference numeral 28 and having an upper chamber section 29 and a lower chamber section 30 mating along a line 31. The upper wall of the chamber section 29 is spaced from the air inlet to provide an air chamber 32 therebetween. The lower section 30 has an annular portion 32 in which there is formed an aperture 33 which is in fluid communication with a liquid inlet pipe 34. The annular portion 32 is secured to the lower wall of the lower housing member 26 by means of fasteners 35. A shroud 36 is secured to the lower housing member 17 and carries a sealing ring 37 in a groove in its inner periphery. The entire module 12 is thus readily engageable with and disengageable from the inlet pipe 34 when it is desired to remove the module for cleaning.

The upper and lower sections 29 and 30 are provided with semicircular apertures 38 and 39, respectively, which mate along the line 31 and have their axes in registry with the axes of the nozzles 27. The upper section 29 and the lower section 30 are formed with tapering peripheral end portions 40 and 41, respectively, which cooperate to define relatively small diameter jet nozzles 42.

The upper and lower housing members 16, 17, 29 and 30 are preferably all composed of a relatively lightweight strong material such as a fiber reinforced plastic. Such structures, known in the art as "FRP" may be composed of material such as glass reinforced thermoplastics such as acrylonitrile-butadiene-styrene, polystyrene, polyethylene, polypropylene, polysulfone resins, polycarbonate resins, polyvinyl chloride or thermoplastic polyester resins. They can be conveniently molded or otherwise formed into the relatively simple shapes required in producing the modules of the present invention. They also lend themselves to adhesive bonding and are considerably less expensive than the corrosion resistant metal structures which have heretofore been employed for similar purposes.

A modified form of the invention is shown in FIG. 5 of the drawings. This type of structure is designed for permanent installations so that the bottom portion 30 of the chamber and the lower wall of the lower housing 17 are permanently secured together by means of fasteners 43 to a flange portion of an inlet pipe 44.

The liquid to be treated is injected into the module through the conduit 34 and is thereupon radially projected through the nozzle 42 into the jet nozzles 27 where the liquid streams entrain substantial amounts of air from the air chamber 32 and produce a thoroughly agitated admixture of air and liquid which issues from the nozzle 27.

The modules of the present invention thus provide a highly efficient but highly economical means for securing thorough mixing of a gas stream with a liquid stream. The modules have adequate structural strength, are completely resistant to corrosion and are easy to clean.

It should be evident that various modifications can be made to the described embodiments without departing from the scope of the present invention.

I claim as my invention:

1. A jet aerator module comprising a housing constructed of sheet form material, a gas inlet in said housing for introducing a pressurized oxidizing gas into said housing, a liquid inlet in said housing axially spaced from said gas inlet for introducing liquid to be treated into said housing, an inner liquid carrying chamber composed of sheet form material disposed within said housing in spaced relation to said gas inlet, thereby providing a gas chamber between said chamber and said gas inlet, said housing being provided with angularly spaced relatively large diameter jet nozzles about its periphery and said inner chamber being provided with smaller diameter jet nozzles about its periphery in axial registry with said relatively large diameter jet nozzles in said housing, but being axially spaced therefrom to permit substantial gas entrainment by the liquid stream issuing from each smaller diameter jet nozzle before it issues from a larger diameter jet nozzle, both said housing and said liquid carrying chamber being composed of two mating sections of sheet form material, said sections mating along the axes of the nozzles formed in the respective sections.

2. A jet aerator apparatus comprising an outer housing means having a gas chamber with a gas inlet and a plurality of outer nozzles angularly spaced about said outer housing means for discharging liquid and gas, said outer housing means being formed of molded sheet wall sections each having nozzle defining portions and chamber defining portions, means joining sheet wall sections together at a mating line to form said outer nozzles and said gas chamber, an inner housing means having a liquid chamber with a liquid inlet and a plurality of inner liquid discharging nozzles aligned with and spaced radially inwardly of said outer nozzles said inner nozzles being spaced from said outer nozzles to permit substantial gas entrapment by the liquid stream issuing from each inner nozzle before it issues from an outer nozzle, said inner liquid housing means being formed of at least two molded sheet wall sections each having inner nozzle defining portions and liquid chamber defining portions, means joining said inner sheet wall sections together at a mating line to form said inner nozzles and said liquid chamber, and means joining said inner housing means to said outer housing means.

3. The aerator module of claim 2 in which said liquid inlet includes means for releasably connecting the same to a liquid carrying conduit.

4. The aerator module of claim 3 in which said liquid inlet includes a cylindrical neck and a seal ring carried along the inner periphery of said neck.

5. The aerator module of claim 2 in which both said inner and outer housing means are composed of a glass fiber-synthetic resin matrix.

6. The aerator module of claim 2 in which both said said inner nozzles are of a smaller diameter than said outer nozzles, said housing sections mating along the axis of the nozzles formed by the respective sections.

7. The aerator module of claim 6 in which said liquid carrying chamber has a centrally disposed aperture overlying said liquid inlet, and said means joining said inner housing means to said outer housing means is located at said liquid inlet.

* * * * *

UNITED STATES PATENT AND TRADEMARK OFFICE
CERTIFICATE OF CORRECTION

PATENT NO. : 3,951,344
DATED : April 20, 1976
INVENTOR(S) : George E. Wilson

It is certified that error appears in the above-identified patent and that said Letters Patent are hereby corrected as shown below:

Column 2, line 21, change "of" to -- or --.

Column 4, line 55, before "chamber" (second occurrence) insert -- inner liquid carrying --.

Column 6, line  3, change "module" to -- apparatus --.

Column 6, line  7, change "module" to -- apparatus --.

Column 6, line 10, change "module" to -- apparatus --.

Column 6, line 13, change "module" to -- apparatus --.

Column 6, line 17, change "module" to -- apparatus --.

Signed and Sealed this

Ninth Day of November 1976

[SEAL]

Attest:

RUTH C. MASON
*Attesting Officer*

C. MARSHALL DANN
*Commissioner of Patents and Trademarks*